(12) United States Patent
Ashton

(10) Patent No.: US 6,950,544 B2
(45) Date of Patent: Sep. 27, 2005

(54) AUTOMATED MEASUREMENT OF ANATOMICAL STRUCTURES IN MEDICAL IMAGING

(75) Inventor: Edward Ashton, Webster, NY (US)

(73) Assignee: VirtualScopics, LLC, Pittsford, NY (US)

( * ) Notice: Subject to any disclaimer, the term of this patent is extended or adjusted under 35 U.S.C. 154(b) by 162 days.

(21) Appl. No.: 10/366,693

(22) Filed: Feb. 14, 2003

(65) Prior Publication Data

US 2004/0161138 A1 Aug. 19, 2004

(51) Int. Cl.[7] .............................. G06K 9/00; A61B 5/05
(52) U.S. Cl. ...................................... 382/131; 600/408
(58) Field of Search ................................ 328/128–134, 328/158–159, 173, 224, 225–228, 289, 294, 296; 600/408, 410, 473; 607/45

(56) References Cited

PUBLICATIONS

Alex P. Zijdenbos et al, "Automatic 'Pipeline' Analysis of 3–D MRI Data for Clinical Trials: Application to Multiple Sclerosis," IEEE Transactions on Medical Imaging, vol. 21, No. 10, Oct., 2002, pp. 1280–1291.

Primary Examiner—Kanjibhai Patel
(74) Attorney, Agent, or Firm—Blank Rome LLP

(57) ABSTRACT

An automated process classifies MRI or other medical imaging data as belonging to neurological structures. A training part of the process uses a baseline data set with accompanying classification map, as well as an arbitrary number of training data sets, also with accompanying classification maps. Each training data set is registered to the baseline data set using a warp-based automated registration algorithm. The resulting probability map, mean values and covariance matrices are used to classify structures in an image data set using a maximum likelihood criterion.

52 Claims, 3 Drawing Sheets

AUTOMATED MEASUREMENT OF ANATOMICAL STRUCTURES IN MEDICAL IMAGING

FIELD OF THE INVENTION

The present invention is directed to a system and method for measuring anatomical structures in medical imaging, such as MRI, and more particularly to a system and method in which the measurement is fully automated.

DESCRIPTION OF RELATED ART

Accurate identification and measurement of various neurological structures is a vital tool both for surgical planning and for evaluation of disease progression and patient response to therapy for numerous diseases. Measurement of white matter lesion burden is a primary method for evaluation of multiple sclerosis (MS) progression. Hippocampal volume is an important endpoint for diagnosing and monitoring both intractable temporal lobe epilepsy and Alzheimer's disease.

Current standard methods for obtaining these data points are largely manual and subjective, and are therefore both error-prone and subject to inter- and intra-operator variability. In addition, manual tracing of abnormal neurological structures requires both considerable expertise and a great deal of time.

Ashton et al. (E. Ashton, K. Parker, M. Berg, C. Chen, "A novel volumetric feature extraction technique, with applications to MR images," IEEE *Trans. Medical Imaging* 16(4), pp. 365–71, 1997) and Hsu et al. (Y. Hsu, N. Schuff et al., "Comparison of automated and manual MRI volumetry of hippocampus in normal aging and dementia," *Journal of MRI* 16, pp. 305–310, 2002) have presented semi-automated methods for the identification and measurement of the hippocampus. In addition, several groups have recently evaluated the speed, precision and accuracy of automated and semi-automated novel MS lesion identification and quantification techniques. Brunetti et al. (A. Brunetti, A. Larobina, M. Quarantelli, M. Tedeschi, E. Ciarmiello, A. Covelli, and M. Salvatore, "Automated segmentation and measurement of global white matter lesion volume in patients with multiple sclerosis," J. of MRI 12(6), pp. 799–807, 2000) have described an automated method for white matter lesion quantification, reporting a sensitivity of 87.3% and coefficient of variation over repeated measurements of 9.4%. Rovaris et al. (M. Rovaris, M. Inglese, R. van Schijndel, M. Sormani, M. Rodegher, G. Comi, and M. Filippi, "Sensitivity and reproducibility of volume change measurements of different brain portions on magnetic resonance imaging in patients with multiple sclerosis," J. of Neurology 247(12), pp. 960–965, 2000) have reported an intra-observer coefficient of variation for repeated measurements using a semi-automated local thresholding technique of 2.6%. Dastidar et al. (P. Dastidar, T. Heinonen, T. Lehtimaki, M. Ukkonen, J. Peltola, T. Erila, E. Laasonen, and I. Elovaara, "Volumes of brain atrophy and plaques correlated with neurological disability in secondary progressive multiple sclerosis," *J. of the Neurological Sciences* 165(1), pp. 36–42, 1999) have described a semi-automated method for lesion burden measurement with coefficients of variation for inter-observer variability of 7% and for intra-observer variability of 4%, and a total measurement time of 10 minutes per scan. Ballester et al. (M. Ballester, A. Zisserman, and M. Brady, "Segmentation and measurement of brain structures in MRI including confidence bounds," *Medical Image Analysis* 4(3), pp. 189–200, 2000) have estimated the measurement confidence interval associated with measurement of MS lesions using four automated methods, reporting results ranging from 28.3% to 44.9% of total lesion volume. In addition, Van Leemput et al. (K. Van Leemput, F. Maes, D. Vandermeulen, A. Colchester, and P. Suetens, "Automated segmentation of multiple sclerosis lesions by model outlier detection," IEEE *Trans. Medical Imaging* 20(8), pp. 677–688, 2001) have reported an inter-operator coefficient of variation for manual measurement of MS lesions using two expert raters of 18.3%.

Zijdenbos et al (A. P. Zijdenbos et al, "Automatic 'Pipeline' Analysis of 3-D MRI Data for Clinical Trials: Application to Multiple Sclerosis," IEEE *Transactions on Medical Imaging*, Vol 21, No. 10, October, 2002, pp. 1280–1291) teach the use of an artificial neural network to identify multiple sclerosis lesions. The output for each voxel is binary, i.e., simply "lesion" or "non-lesion." The use of an artificial neural network adds complexity.

Clearly, there is a need for a rapid automated method for the identification and measurement of both normal and abnormal anatomical structures. However, as yet there is no generally accepted solution to this problem.

SUMMARY OF THE INVENTION

As noted above, there is a need for a rapid automated system and method for the identification and measurement of both normal and abnormal anatomical structures. It is therefore an object of the invention to provide such a system and method.

It is another object of the invention to provide such a system and method that operate rapidly and accurately.

It is still another object of the invention to provide such a system and method that eliminate both intra-operator and inter-operator variation.

It is yet another object of the invention to provide such a system and method that do not require the use of an artificial neural network.

It is yet another object of the invention to provide such a system and method that can be adapted to the classification of multiple structures, whether normal or abnormal.

To achieve the above and other objects, the present invention is directed to a method for fully automating the measurement of various neurological (or other) structures in medical imaging, e.g., MRI. This technique uses an atlas-based trained maximum likelihood classifier. The classifier uses a map of prior probabilities, which is obtained by registering a large number of previously classified data sets to the atlas and calculating the resulting probability that each represented tissue type or structure will appear at each voxel in an idealized atlas. Classification is then carried out using the standard maximum likelihood discriminant function, assuming normal statistics. The results of this classification process can be used in three ways, depending on the type of structure that is being detected or measured. In the most straightforward case, measurement of a normal anatomical structure such as the hippocampus, the results of the classifier provide a localization point and orientation for the initiation of a deformable template model, which is then optimized with respect to the data under consideration. The detection and measurement of abnormal structures, such as white matter lesions in multiple sclerosis patients, requires a slightly different approach. Lesions are detected through the application of a trained classifier to areas identified by the original classifier as white matter. Finally, detection of unknown abnormalities can be accomplished through anomaly detection in which voxels are flagged based on their goodness-of-fit to the classifier model.

The test cases used involved the measurement of multiple sclerosis lesions in axial MRI series and the measurement of hippocampus volumes in coronal MRI series, but the technique is a general one, and should be useful for measuring most normal and abnormal anatomical structures. The results from the MS lesion measurement experiments were compared to computer-aided manual lesion identification and measurement. The results of the hippocampus measurement experiments were likewise compared to computer-aided manual lesion identification and measurement. Both automated and manual processes were evaluated in terms of required operator time and repeatability using clinical data. In addition, the automated process was compared to the mean manual measurements in both cases as a preliminary estimate of global accuracy.

One manual and one automated measurement technique were evaluated. All measurements were carried out using software developed by VirtualScopics, a biomedical image analysis firm based in Rochester, N.Y. Manual measurements were carried out by expert observers, who were required to trace the boundaries of each structure of interest in each experimental data set using a computer mouse. Once the tracing was completed, volume measurements for each structure were calculated automatically.

BRIEF DESCRIPTION OF THE DRAWINGS

A preferred embodiment of the invention will be set forth in detail with reference to the drawings, in which.

DETAILED DESCRIPTION OF THE PREFERRED EMBODIMENT

A preferred embodiment of the present invention and experimental results therefrom will now be set forth in detail with reference to the drawings.

Figure 1:
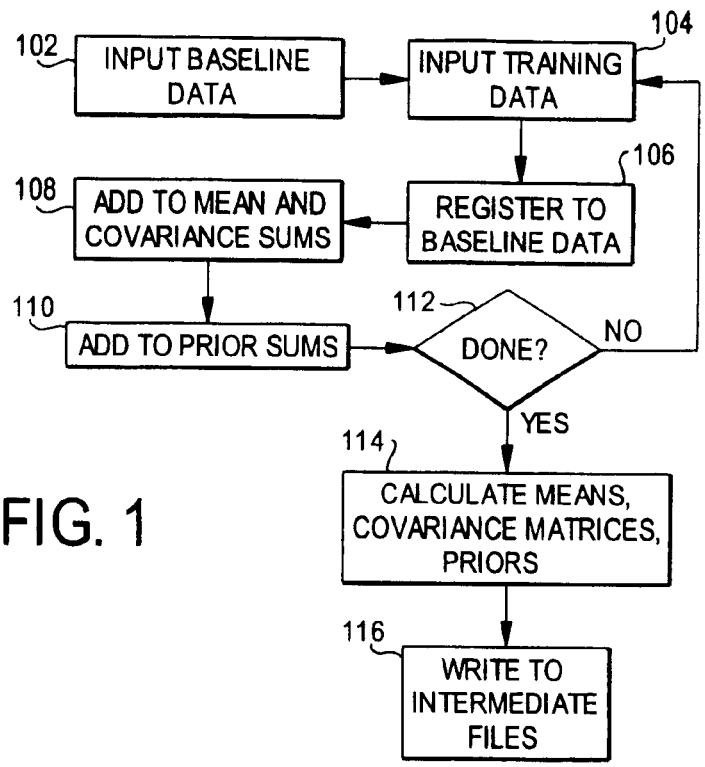
FIG. 1 shows a flow chart of a training process according to the preferred embodiment.

The method according to the preferred embodiment involves both training and classification. FIG. 1 shows a flow chart of the training. Automated measurements are made using a trained statistical classifier. Training is carried out using a software package which takes as its inputs a baseline data set with accompanying classification map in step 102, as well as an arbitrary number of training data sets in step 104, also with accompanying classification maps. Each training data set is registered to the baseline data set in step 106 using a warp-based automated registration algorithm. Warps could be applied by a number of widely accepted registration techniques. The result of that registration is that class statistics are added to the mean and covariance sums in step 108, and then spatial probabilities are added to the prior sums in step 110. Once it is determined in step 112 that all training data sets have been registered, means and covariance matrices are then calculated in step 114 for each class represented in the classification maps. In addition, the prior probability of each class occurring at each voxel in the training data is also calculated in step 114. Once all training data sets have been processed, the results are written out to intermediate files in step 116. The intermediate files can be used in the same system in which they were generated, or they can be written to a persistent storage medium for use in another system.

Figure 2:
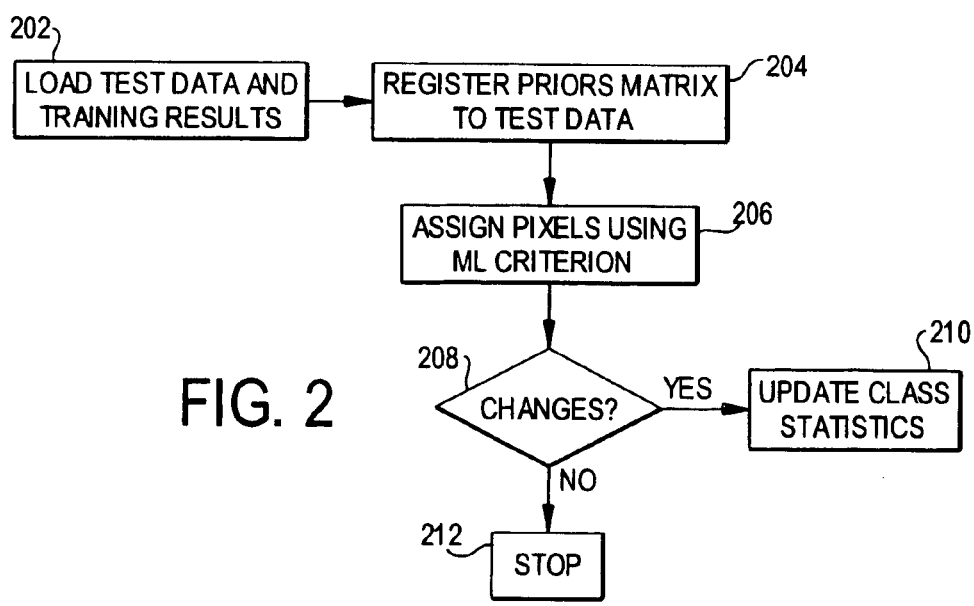
FIG. 2 shows a flow chart of a classification process according to the preferred embodiment.

FIG. 2 shows a flow chart of the classification. The classification software package takes as its inputs the data set under consideration, the baseline data set used during training, and the outputs of the training process, which are loaded in step 202. As noted above, the intermediate files could have been derived in the same system or could have been loaded from a different system. At initiation, the baseline data set is registered to the data set under consideration, and the resulting warp field is then used to register the prior probabilities matrix to the data set under consideration in step 204. The data, prior probabilities matrix, means, and covariance matrices are then passed to an iterative maximum likelihood classification algorithm. That algorithm classifies voxels in the image using a maximum likelihood criterion in step 206, subject to a convergence criterion. The convergence criterion is global maximization of the maximum likelihood discriminant function, given by:

$$g_i(x) = \ln(p(\omega_i)) - \frac{1}{2}\ln|R_i| - \frac{1}{2}(x - m_i)^t R_i^{-1}(x - m_i)$$

where $R_i$ is the class covariance matrix for class i, $m_i$ is the class mean for class i, x is the signature of the voxel under consideration, and $p(\omega_i)$ is the prior probability that the voxel under consideration is a member of class i. If it is determined in step 208 that the processing in step 206 results in changes such that the convergence criterion is not met, all class statistics are updated in step 210, and the process of step 206 is repeated. Once the convergence criterion has been met, the process stops in step 212.

The results of this can be refined by use of a shape-based feature extraction algorithm which is located and oriented by the use of this invention. For example Ashton, et al (1997) describes the use of a deformable template which could now, by this invention, be initialized automatically.

Figure 3C:
FIGS. 3A–3C show images from a data set for measurement of abnormal structures.
Figure 3B:
Figure 3A:

A study has been conducted to determine the ability of the process of FIGS. 1 and 2 to identify and measure both normal and abnormal neurological structures. The inventors therefore made use of two experimental data sets. The first set was intended to allow measurement of abnormal structures—namely, white matter lesions in multiple sclerosis patients. This data set consisted of T1, T2, and proton density weighted MRI scans for three multiple sclerosis patients, with 2 to 4 repeats for each patient taken over the course of 4 to 8 days. A total of 9 studies were analyzed. These studies were originally collected in 1997 for use in an unrelated experiment, and were provided without patient identification information. The data were acquired on General Electric Signa 1.5 Tesla Horizon MR Scanners. The images were obtained using the standard GE head coil. The thickness was 5 mm with a skip of 5 mm with a 256×192 matrix. The software version was 04. In-plane resolution in these scans was 0.86 mm. Sample images from this data set are shown in FIGS. 3A–3C for MS patients 1–3, respectively.

Figure 4C:
FIGS. 4A–4C show images from a data set for measurement of normal structures.
Figure 4B:
Figure 4A:

The second experimental data set was intended to allow the measurement of normal neurological structures—in particular, the hippocampus. This data set consisted of 10 coronal T1 weighted MRI studies taken from normal volunteers. All volunteers provided informed consent prior to enrollment in this study. MR acquisition was 3D, with a slice thickness of 2.5 mm. Sample images from this data set are given in FIGS. 4A–4C for subjects 1, 5 and 10, respectively.

The experiments were intended to assess several parameters. First, the inventors wished to determine the level of precision achievable in the volumetric measurement of both normal and abnormal neurological structures using manual tracing. To that end, a single trained observer was required to manually trace each white matter lesion in the baseline studies for each of the three MS patients in 9 separate trials. This allowed estimation of intra-observer variability for lesion measurement. Four trained observers were then required to manually trace each white matter lesion for each baseline study once, allowing estimation of inter-observer variability. A similar procedure was followed for the 10 normal coronal studies, with the exception that only four repeats were required for the intra-observer variability trials. These experiments allowed estimation of intra- and inter-observer variability for manual measurement of the hippocampus.

The second parameter of interest was absolute accuracy of the automated measurement system. Because this system is fully automated, intra- and inter-observer variability were assumed to be zero. Accuracy is clearly more difficult than variability to assess, as the only gold standard measurements available for either data set were the manual measurements generated in the first experiment, and manual measurements are known to be subject both to observer bias and to random error. In order to estimate accuracy, each coronal T1 study was evaluated automatically using a "drop one" training procedure—i.e., each study was evaluated using a training set made up of all other studies of the appropriate type. MS patient studies were evaluated automatically at baseline, with the training set made up of the 6 non-baseline studies. The results of these analyses were then compared to the mean of the inter-observer measurements from experiment 2, with bias calculated in terms of volume, percent of manual measurement, and volume divided by the appropriate standard deviation.

Results of the white matter lesion intra-operator variability trials, measuring precision over repeated measurements of white matter lesions in the three baseline studies, are given in Table 1. Corresponding results for measurements of the hippocampus are given in Table 2.

Table 1 shows results of manual intra-operator variability study for white matter lesions. This table shows results for 9 measurements of each patient's total lesion burden in cubic centimeters, along with mean value, standard deviation, and coefficient of variation for each measurement technique.

TABLE 1

| | T1 | T2 | T3 | T4 | T5 | T6 | T7 | T8 | T9 | M. | S.D. | C.V. |
|---|---|---|---|---|---|---|---|---|---|---|---|---|
| P1 | 20.0 | 21.2 | 20.8 | 20.6 | 20.2 | 19.1 | 21.0 | 20.4 | 19.2 | 20.3 | 0.7 | 3.4% |
| P2 | 26.8 | 26.5 | 22.5 | 23.1 | 24.3 | 24.1 | 26.0 | 26.8 | 24.9 | 25.3 | 1.7 | 6.7% |
| P3 | 9.6 | 10.5 | 10.6 | 9.2 | 10.4 | 10.4 | 10.1 | 8.0 | 10.1 | 9.8 | 0.8 | 8.2% |

Table 2 shows results of manual intra-operator variability study for hippocampus measurement.

TABLE 2

| | T1 | T2 | T3 | T4 | Mean | SD | CV |
|---|---|---|---|---|---|---|---|
| Subject 1R | 2.133 | 1.935 | 2.014 | 2.097 | 2.04475 | 0.088523 | 4.3% |
| Subject 1L | 1.838 | 1.522 | 1.643 | 1.862 | 1.71625 | 0.162445 | 9.5% |
| Subject 2R | 2.679 | 2.447 | 2.502 | 2.326 | 2.4885 | 0.146744 | 5.9% |
| Subject 2L | 2.356 | 2.462 | 2.565 | 2.394 | 2.44425 | 0.091667 | 3.7% |
| Subject 3R | 2.171 | 2.084 | 2.221 | 2.312 | 2.197 | 0.0953 | 4.3% |
| Subject 3L | 2.021 | 2.144 | 2.016 | 2.029 | 2.0525 | 0.061235 | 3.0% |
| Subject 4R | 2.509 | 2.307 | 2.119 | 2.33 | 2.31625 | 0.159515 | 6.9% |
| Subject 4L | 2.532 | 2.352 | 2.12 | 2.244 | 2.312 | 0.174631 | 7.6% |
| Subject 5R | 1.78 | 1.828 | 1.822 | 1.663 | 1.77325 | 0.076539 | 4.3% |
| Subject 5L | 1.856 | 1.73 | 2.016 | 1.828 | 1.8575 | 0.118675 | 6.4% |
| Subject 6R | 1.896 | 1.702 | 1.613 | 1.697 | 1.727 | 0.119836 | 6.9% |
| Subject 6L | 1.778 | 1.637 | 1.679 | 1.818 | 1.728 | 0.084226 | 4.9% |
| Subject 7R | 1.445 | 1.471 | 1.501 | 1.428 | 1.46125 | 0.031858 | 2.2% |
| Subject 7L | 1.344 | 1.596 | 1.373 | 1.267 | 1.395 | 0.141268 | 10.1% |
| Subject 8R | 1.315 | 1.377 | 1.54 | 1.515 | 1.43675 | 0.108285 | 7.5% |
| Subject 8L | 1.198 | 1.409 | 1.522 | 1.507 | 1.409 | 0.149325 | 10.6% |
| Subject 9R | 1.988 | 2.175 | 2.066 | 2.057 | 2.0715 | 0.077298 | 3.7% |
| Subject 9L | 1.867 | 1.939 | 2.095 | 1.988 | 1.97225 | 0.095741 | 4.9% |
| Subject 10R | 2.096 | 2.093 | 2.157 | 2.151 | 2.12425 | 0.034461 | 1.6% |
| Subject 10L | 1.636 | 1.758 | 1.824 | 1.721 | 1.73475 | 0.078415 | 4.5% |

As these results make clear, the use of manual tracing as a measurement technique introduces a significant amount of variability, even when all measurements are made by the same individual. This variability is even greater when multiple observers are used. Results of inter-operator variability experiments in the manual measurement of white matter lesions are given in Table 3. Measurements were made by four expert observers. Volumes are given in cubic centimeters.

TABLE 3

|  | Obs. 1 | Obs. 2 | Obs. 3 | Obs. 4 | Mean | Std. Dev. | C.V. |
|---|---|---|---|---|---|---|---|
| Patient 1 | 27.0 | 18.8 | 20.6 | 18.4 | 21.2 | 4.0 | 18.9% |
| Patient 2 | 22.8 | 25.3 | 27.3 | 21.0 | 24.1 | 2.8 | 11.5% |
| Patient 3 | 9.9 | 9.7 | 10.8 | 6.7 | 9.3 | 1.8 | 19.2% |

Table 4 shows results of manual inter-operator variability study for hippocampus measurement. Volumes are given in cubic centimeters.

TABLE 4

|  | Obs. 1 | Obs. 2 | Obs. 3 | Obs. 4 | Mean | SD | CV |
|---|---|---|---|---|---|---|---|
| Subject 1 R | 3.015 | 2.975 | 2.978 | 2.94 | 2.977 | 0.030649 | 1.0% |
| Subject 1 L | 2.459 | 2.791 | 3.556 | 2.27 | 2.769 | 0.567143 | 20.5% |
| Subject 2 R | 3.939 | 3.234 | 4.649 | 3.262 | 3.771 | 0.669965 | 17.8% |
| Subject 2 L | 3.787 | 3.265 | 4.7 | 2.96 | 3.678 | 0.762115 | 20.7% |
| Subject 3 R | 3.582 | 2.472 | 4.132 | 2.461 | 3.16175 | 0.833627 | 26.4% |
| Subject 3 L | 3.489 | 2.582 | 3.546 | 2.339 | 2.989 | 0.618708 | 20.7% |
| Subject 4 R | 3.324 | 3.096 | 4.126 | 2.663 | 3.30225 | 0.613791 | 18.6% |
| Subject 4 L | 3.259 | 2.472 | 4.249 | 2.684 | 3.166 | 0.794879 | 25.1% |
| Subject 5 R | 2.182 | 2.647 | 4.415 | 3.343 | 3.14675 | 0.970818 | 30.9% |
| Subject 5 L | 2.194 | 2.341 | 3.679 | 3.245 | 2.86475 | 0.714566 | 25.0% |
| Subject 6 R | 2.73 | 3.322 | 4.524 | 3.325 | 3.47525 | 0.753068 | 21.7% |
| Subject 6 L | 2.815 | 3.775 | 4.283 | 3.753 | 3.6565 | 0.612094 | 16.7% |
| Subject 7 R | 1.998 | 2.481 | 3.569 | 3.183 | 2.80775 | 0.703035 | 25.0% |
| Subject 7 L | 2.124 | 2.315 | 3.07 | 2.91 | 2.60475 | 0.45633 | 17.5% |
| Subject 8 R | 2.54 | 3.659 | 4.57 | 3.892 | 3.66525 | 0.843843 | 23.0% |
| Subject 8 L | 2.768 | 3.73 | 4.23 | 3.367 | 3.52375 | 0.615645 | 17.5% |
| Subject 9 R | 2.566 | 2.371 | 4.716 | 4.108 | 3.44025 | 1.15196 | 33.5% |
| Subject 9 L | 2.568 | 2.538 | 4.23 | 3.731 | 3.26675 | 0.84906 | 26.0% |
| Subject 10R | 3.507 | 2.498 | 4.118 | 3.381 | 3.376 | 0.667991 | 19.8% |
| Subject 10L | 3.909 | 3.3 | 3.918 | 3.46 | 3.64675 | 0.314888 | 8.6% |

As expected, coefficients of variability for the inter-operator variability study are significantly higher than those for the intra-operator variability study, ranging as high as 33.5%. Much of this disagreement stems from the difficulty of separating the hippocampal head from the amygdala and of separating the hippocampal tail from the caudate nucleus.

Figure 5A:
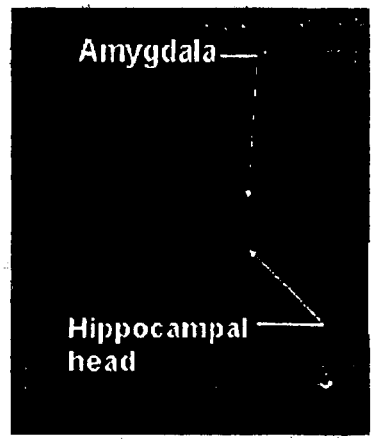
FIGS. 5A and 5B show results from manual measurement.
Figure 5B:
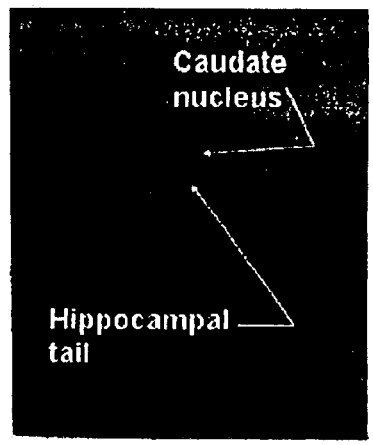

These difficulties are illustrated in FIGS. 5A and 5B. FIG. 5A shows separation of the right hippocampal head from the basal nucleus of the amygdala. FIG. 5B shows separation of the left hippocampal tail from the tail of the caudate nucleus.

The results of the automated hippocampus measurement experiment are given in Table 5. The automated measurements are within one standard deviation of the manual ones in 13/20 cases, and within two standard deviations in an additional 3 cases. Comparison is made to the manual results shown in Table 4, with error calculated in terms of manual standard deviations from the inter-observer mean value.

TABLE 5

|  | Auto. Volume | Man. Volume | Abs. Error | Pct. Error | Sigma Error |
|---|---|---|---|---|---|
| Subject 1R | 3.314 | 2.977 | 0.337 | 11.3 | 10.9 |
| Subject 1L | 3.089 | 2.769 | 0.32 | 11.5 | 0.56 |
| Subject 2R | 3.714 | 3.771 | −0.057 | −1.5 | −0.08 |
| Subject 2L | 3.539 | 3.678 | −0.139 | −3.7 | −0.18 |
| Subject 3R | 3.411 | 3.16175 | 0.24925 | 7.8 | 0.29 |
| Subject 3L | 4.006 | 2.989 | 1.017 | 34.0 | 1.64 |
| Subject 4R | 4.973 | 3.30225 | 1.67075 | 50.5 | 2.72 |
| Subject 4L | 4.535 | 3.166 | 1.369 | 43.2 | 1.72 |
| Subject 5R | 3.998 | 3.14675 | 0.85125 | 27.0 | 0.87 |
| Subject 5L | 4.815 | 2.86475 | 1.95025 | 68.0 | 2.72 |
| Subject 6R | 3.225 | 3.47525 | −0.25025 | −7.2 | −0.33 |
| Subject 6L | 3.447 | 3.6565 | −0.2095 | −5.7 | −0.34 |
| Subject 7R | 3.036 | 2.80775 | 0.22825 | 8.1 | 0.32 |
| Subject 7L | 3.089 | 2.60475 | 0.48425 | 18.5 | 1.06 |
| Subject 8R | 4.323 | 3.66525 | 0.65775 | 17.9 | 0.77 |
| Subject 8L | 4.829 | 3.52375 | 1.30525 | 37.0 | 2.12 |
| Subject 9R | 3.839 | 3.44025 | 0.39875 | 11.5 | 0.34 |
| Subject 9L | 3.408 | 3.26675 | 0.14125 | 4.3 | 0.16 |
| Subject 10R | 3.751 | 3.376 | 0.375 | 11.1 | 0.56 |
| Subject 10L | 3.804 | 3.64675 | 0.15725 | 4.3 | 0.49 |

Results for the automated white matter lesion measurement experiment are given in Table 6. Error is again calculated in terms of standard deviations from the inter-observer manual mean. Note that automated measurements are within one standard deviation of manual ones in 2/3 cases.

TABLE 6

|  | Auto. Volume | Man. Volume | Abs. Error | Pct. Error | Sigma Error |
|---|---|---|---|---|---|
| Patient 1 | 22.4 | 21.2 | 1.2 | 5.6 | 0.3 |
| Patient 2 | 25.7 | 24.1 | 1.6 | 6.6 | 0.57 |
| Patient 3 | 11.4 | 9.3 | 2.1 | 22.5 | 1.16 |

The results just presented raise a number of interesting points. In comparing manual results to one another and to automated measurements, one of the most notable facts is that manual measurements have a high coefficient of variability for both white matter lesions and the hippocampus. The mean inter-operator coefficient of variability for hippocampal measurements in these experiments was 20.8%, while the mean inter-operator coefficient of variability for white matter lesion measurement was 16.5%. Intra-operator variability was also relatively high, averaging 10.5% for hippocampal measurement and 6.1% for white matter lesion measurement. These numbers are comparable to those cited in the articles listed under "Description of Related Art." Variability of this magnitude places a heavy burden on any study attempting to measure changes in structural volumes, and points out the pressing need for an automated, repeatable solution to the problem of structural identification and measurement.

Figure 6:
FIG. 6 shows results from automated measurement.

Examination of the automated results shows that the volumes are in most cases within a standard deviation or less of the mean manual measurement. In the case of hippocampal measurement, the automated measurement differs from the manual mean in a significant way in 5/20 structures measured. Moreover, in each of these cases the error is an over-measurement stemming from an error in registering the anatomical atlas volume to the test data. An example of this sort of error is given in FIG. 6, which shows that a mis-alignment of the anatomical atlas with Subject 4 has caused the identification of the hippocampus to include a portion of the collateral sulcus, resulting in an over-estimation of the total hippocampal volume.

Errors of this sort can be corrected through a refinement of the registration algorithm used in this work. In particular, the algorithm currently selects warp mesh vertices using an analysis of local edge strength. Because the hippocampus does not have particularly high contrast with surrounding tissues, relatively few vertices surround the hippocampus itself, causing occasional errors when the location of the hippocampus relative to higher-contrast structures in a particular individual is unusual. It is relatively simple to alter the algorithm to force mesh vertices around the perimeter of the hippocampus in the anatomical atlas.

Figure 7:
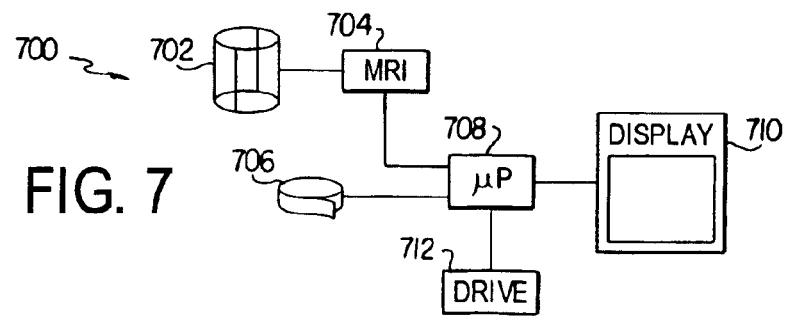
FIG. 7 shows a block diagram of a system on which the preferred embodiment can be implemented.

The present invention can be implemented in a system such as that shown in FIG. 7. The system 700 has a suitable device for taking image data to be analyzed, such as an MRI coil 702 and an MRI device 704. The system 700 also has a device for importing training data 706; any suitable reader for computer-readable media can be used. A microprocessor 708 receives both the image data to be analyzed and the training data and performs the operations of FIGS. 1 and 2. Any suitable output device, such as a display 710 or a printer, can display the results of analysis. The system can be modified in any suitable way, e.g., by providing separate systems for carrying out the operations of FIGS. 1 and 2, as noted above, in which case a drive 712 for reading or writing information from or to a persistent storage medium can be provided.

While a preferred embodiment of the invention has been set forth above, those skilled in the art who have reviewed the present disclosure will readily appreciate that other embodiments can be realized within the scope of the invention. For example, the invention can be implemented for use with 2D or 3D data from any imaging technique and is not limited to MRI. Also, the invention can be adapted for use with any neurological or non-neurological regions of interest in the human or animal body and more broadly to any situation in which automated measurement of structures is desired. Therefore, the present invention should be construed as limited only by the appended claims.

I claim:

1. A method for automated measurement of a structure in an image data set, the method comprising:

(a) providing a baseline data set, a plurality of training data sets and classifying maps identifying the structure in the baseline data set and in each of the plurality of training data sets;

(b) registering each of the plurality of training data sets to the baseline data set to produce a first registration result;

(c) from the first registration result, deriving class statistics comprising a mean value, a covariance matrix, and a probability map indicating a probability that the structure is found in each image element in each of the plurality of training data sets;

(d) registering the baseline data set to the image data set to produce a second registration result;

(e) from the second registration result, registering the probability map to the image data set to produce a third registration result; and (f) from the third registration result and the class statistics derived from the first registration result, locating the structure in the image data set.

2. The method of claim 1, wherein at least one of the first and second registration results is produced through warp-based automated registration.

3. The method of claim 1, wherein step (f) is performed using a maximum likelihood criterion.

4. The method of claim 1, wherein a plurality of said structures are to be located in the image data set and are represented in both the baseline data set and each of the plurality of training data sets.

5. The method of claim 4, wherein the probability map represents a probability that each of the plurality of structures is found in each image element in each of the plurality of training data sets.

6. The method of claim 5, wherein step (c) comprises producing, for each of the plurality of structures, a mean value and a covariance matrix.

7. The method of claim 6, wherein step (f) is performed using a maximum likelihood criterion.

8. The method of claim 7, wherein step (f) is performed using, as a convergence criterion, a global maximization of a maximum likelihood discriminant function.

9. The method of claim 1, wherein the structure is a biological structure in a body.

10. The method of claim 9, wherein the structure is a neurological structure.

11. The method of claim 9, wherein the image data set is obtained through magnetic resonance imaging.

12. The method of claim 1, wherein step (f) comprises locating and orienting a shape-based feature extraction algorithm in accordance with the third registration result.

13. A system for automated measurement of a structure in an image data set, the system comprising:

an input for receiving the image data set;

an input for receiving a baseline data set, a plurality of training data sets and classifying maps identifying the structure in the baseline data set and in each of the plurality of training data sets; and a computing device, in communication with the inputs, for:

(i) registering each of the plurality of training data sets to the baseline data set to produce a first registration result;

(ii) from the first registration result, deriving class statistics comprising mean value, a covariance matrix and a probability map indicating a probability that the structure is found in each image element in each of the plurality of training data sets;

(iii) registering the baseline data set to the image data set to produce a second registration result;

(iv) from the second registration result, registering the probability map to the image data set to produce a third registration result; and (v) from the third registration result and the class statistics derived from the first registration result, locating the structure in the image data set.

14. The system of claim 13, wherein the computing device performs at least one of the first and second registration results through warp-based automated registration.

15. The system of claim 13, wherein the computing device performs step (v) using a maximum likelihood criterion.

16. The system of claim 13, wherein a plurality of said structures are to be located in the image data set and are represented in both the baseline data set and each of the plurality of training data sets, and wherein the probability map represents a probability that each of the plurality of structures is found in each image element in each of the plurality of training data sets.

17. The system of claim 16, wherein the computing device produces, for each of the plurality of structures, a mean value and a covariance matrix as part of step (ii).

18. The system of claim 17, wherein the computing device performs step (v) using a maximum likelihood criterion.

19. The system of claim 18, wherein the computing device performs step (v) using, as a convergence criterion, a global maximization of a maximum likelihood discriminant function.

20. The system of claim 13, wherein the computing device performs step (v) by locating and orienting a shape-based feature extraction algorithm in accordance with the third registration result.

21. A method for producing a training and classification data set for automated measurement of a structure in an image data set, the method comprising:

(a) providing a baseline data set, a plurality of training data sets and classifying maps identifying the structure in the baseline data set and in each of the plurality of training data sets;

(b) registering each of the plurality of training data sets to the baseline data set to produce a registration result;

(c) from the registration result, deriving class statistics comprising a mean value, a covariance matrix and a probability map indicating a probability that the structure is found in each image element in each of the plurality of training data sets; and (d) writing the class statistics to a file.

22. The method of claim 21, wherein the registration result is produced through warp-based automated registration.

23. The method of claim 21, wherein a plurality of said structures are to be located in the image data set and are represented in both the baseline data set and each of the plurality of training data sets.

24. The method of claim 23, wherein the probability map represents a probability that each of the plurality of structures is found in each image element in each of the plurality of training data sets.

25. The method of claim 24, wherein step (c) comprises producing, for each of the plurality of structures, a mean value and a covariance matrix.

26. The method of claim 21, wherein the structure is a biological structure in a body.

27. The method of claim 26, wherein the structure is a neurological structure.

28. The method of claim 21, wherein step (d) comprises writing the file to a persistent storage medium.

29. A persistent storage medium formed according to the method of claim 28.

30. A system for producing a training and classification data set for automated measurement of a structure in an image data set, the system comprising:

an input for receiving a baseline data set, a plurality of training data sets and classifying maps identifying the structure in the baseline data set and in each of the plurality of training data sets; and a computing device, in communication with the input, for:

(i) registering each of the plurality of training data sets to the baseline data set to produce a registration result;

(ii) from the registration result, deriving class statistics comprising a mean value, a covariance matrix and a probability map indicating a probability that the structure is found in each image element in each of the plurality of training data sets; and (iii) writing the class statistics to a file.

31. The system of claim 30, wherein the computing device performs step (i) through warp-based automated registration.

32. The system of claim 30, wherein a plurality of said structures are to be located in the image data set and are represented in both the baseline data set and each of the plurality of training data sets, and wherein the probability map represents a probability that each of the plurality of structures is found in each image element in each of the plurality of training data sets.

33. The system of claim 32, wherein step (ii) comprises producing, for each of the plurality of structures, a mean value and a covariance matrix.

34. The system of claim 30, further comprising a drive, in communication with the computing device, for writing the file to persistent storage.

35. A method for automated measurement of a structure in an image data set, the method comprising:
(a) providing a baseline data set and class statistics comprising a mean value, a covariance matrix and a probability map indicating a probability that the structure is found in any given image element;
(b) registering the baseline data set to the image data set to produce a registration result;
(c) from the registration result, registering the probability map to the image data set to produce a further registration result; and
(d) from the further registration result and the class statistics, locating the structure in the image data set.

36. The method of claim 35, wherein step (d) is performed using a maximum likelihood criterion.

37. The method of claim 35, wherein a plurality of said structures are to be located in the image data set and are represented in the baseline data set.

38. The method of claim 37, wherein the probability map represents a probability that each of the plurality of structures is found in any given image element.

39. The method of claim 38, wherein the probability map comprises, for each of the plurality of structures, a mean value and a covariance matrix.

40. The method of claim 39, wherein step (d) is performed using a maximum likelihood criterion.

41. The method of claim 40, wherein step (d) is performed using, as a convergence criterion, a global maximization of a maximum likelihood discriminant function.

42. The method of claim 35, wherein the structure is a biological structure in a body.

43. The method of claim 42, wherein the structure is a neurological structure.

44. The method of claim 43, wherein the image data set is obtained through magnetic resonance imaging.

45. The method of claim 35, wherein step (d) comprises locating and orienting a shape-based feature extraction algorithm in accordance with the further registration result.

46. A system for automated measurement of a structure in an image data set, the system comprising:
an input for receiving a baseline data set and class statistics comprising a mean value, a covariance matrix and a probability map indicating a probability that the structure is found in any given image element; and
a computing device, in communication with the input, for:
(i) registering the baseline data set to the image data set to produce a registration result;
(ii) from the registration result, registering the probability map to the image data set to produce a further registration result; and
(iii) from the further registration result and the class statistics, locating the structure in the image data set.

47. The system of claim 46, wherein the computing device performs step (iii) using a maximum likelihood criterion.

48. The system of claim 46, wherein a plurality of said structures are to be located in the image data set and are represented in the baseline data set, and wherein the probability map represents a probability that each of the plurality of structures is found in any given image element.

49. The system of claim 48, wherein the probability map comprises, for each of the plurality of structures, a mean value and a covariance matrix.

50. The system of claim 49, wherein step (iii) is performed using a maximum likelihood criterion.

51. The system of claim 50, wherein step (iii) is performed using, as a convergence criterion, a global maximization of a maximum likelihood discriminant function.

52. The system of claim 46, wherein the computing device performs step (iii) by locating and orienting a shape-based feature extraction algorithm in accordance with the further registration result.

* * * * *